US 12,526,588 B2

(12) United States Patent
Ahn et al.

(10) Patent No.: US 12,526,588 B2
(45) Date of Patent: Jan. 13, 2026

(54) METHOD FOR IMPROVING EFFECTIVE DYNAMIC RANGE OF NEURAL STIMULATION FOR ARTIFICIAL COCHLEAR SYSTEM, AND RECONFIGURABLE CURRENT DAC-BASED NEURAL STIMULATION IC CHIP THEREFOR

(71) Applicants: TODOC CO., LTD., Seoul (KR); KOREA ADVANCED INSTITUTE OF SCIENCE AND TECHNOLOGY, Daejoen (KR)

(72) Inventors: Woojin Ahn, Seoul (KR); Kyousik Min, Gyeonggi-do (KR); Hoseung Lee, Seoul (KR); Minkyu Je, Daejeon (KR)

(73) Assignees: TODOC CO., LTD., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 269 days.

(21) Appl. No.: 18/573,839

(22) PCT Filed: Nov. 19, 2021

(86) PCT No.: PCT/KR2021/017089
§ 371 (c)(1),
(2) Date: Dec. 22, 2023

(87) PCT Pub. No.: WO2023/080312
PCT Pub. Date: May 11, 2023

(65) Prior Publication Data
US 2024/0292162 A1 Aug. 29, 2024

(30) Foreign Application Priority Data
Nov. 4, 2021 (KR) .................. 10-2021-0150449

(51) Int. Cl.
*H04R 25/00* (2006.01)
*A61N 1/05* (2006.01)
(Continued)

(52) U.S. Cl.
CPC ......... *H04R 25/505* (2013.01); *A61N 1/0541* (2013.01); *A61N 1/36039* (2017.08);
(Continued)

(58) Field of Classification Search
CPC .............. A61N 1/0541; A61N 1/36039; A61N 1/36157; A61N 1/37252; A61N 1/05;
(Continued)

(56) References Cited

U.S. PATENT DOCUMENTS 8,694,113 B2 * 4/2014 Smoorenburg .... A61N 1/37235
607/57
10,357,656 B2 * 7/2019 Heasman ............. H04R 25/606
(Continued)

FOREIGN PATENT DOCUMENTS

| KR | 10-2010-0132483 | 12/2010 |
| KR | 10-2016-0045530 | 4/2016 |
| KR | 10-2019-0043944 | 4/2019 |

OTHER PUBLICATIONS

International Search Report mailed Aug. 1, 2022 for PCT/KR2021/017089, 4 pages.
(Continued)

*Primary Examiner* — Brian Ensey

(57) ABSTRACT

The present disclosure discloses a method for improving an effective dynamic range including acquiring a hearing profile of a user, setting a section between a T level and a C level as a target range of a stimulation current for each of a plurality of electrodes included in an electrode array of a
(Continued)

cochlear implant system based on the hearing profile, and mapping a plurality of current levels to an output current within the target range.

4 Claims, 3 Drawing Sheets

(51) Int. Cl.
   *A61N 1/36* (2006.01)
   *A61N 1/372* (2006.01)
(52) U.S. Cl.
   CPC ..... *A61N 1/36157* (2013.01); *A61N 1/37252* (2013.01); *H04R 25/606* (2013.01)
(58) Field of Classification Search
   CPC ...... A61N 1/36; A61N 1/36038; A61N 1/372; A61N 1/36135; H04R 25/505; H04R 25/606; A61B 5/12; A61B 5/121
   See application file for complete search history.

(56) References Cited

U.S. PATENT DOCUMENTS

2015/0237452 A1  8/2015  Vanpoucke
2016/0030753 A1* 2/2016  Shah .................... A61N 1/3754
                                                 607/116

OTHER PUBLICATIONS

Caldwell MT, et al, "Assessment and improvement of sound quality in cochlear implant users," Laryngoscope Investigative Otolaryngology, 2017.

Zeng FG, "Trends in cochlear implants," Trends in Amplification, 2004.

David A. Nelson et al, "Intensity discrimination as a function of stimulus level with electric stimulation," The Journal of the Acoustical Society of America, 1996.

* cited by examiner

< Prior Art >

(a)    (b)

METHOD FOR IMPROVING EFFECTIVE DYNAMIC RANGE OF NEURAL STIMULATION FOR ARTIFICIAL COCHLEAR SYSTEM, AND RECONFIGURABLE CURRENT DAC-BASED NEURAL STIMULATION IC CHIP THEREFOR

This application claims the priority of Korean Patent Application No. 10-2021-0150449, filed on Nov. 4, 2021 in the KIPO (Korean Intellectual Property Office), the disclosure of which is incorporated herein entirely by reference. Further, this application is the National Stage application of International Application No. PCT/KR2021/017089, filed on Nov. 19, 2021, which designates the United States and was published in Korean. Each of these applications is hereby incorporated by reference in their entirety into the present application.

TECHNICAL FIELD

The present invention relates to a method for improving an effective dynamic range of neural stimulation for a cochlear implant system and a neural stimulation IC chip based on a reconfigurable current DAC therefor, and more specifically, the present invention relates to a method for improving an effective dynamic range of neural stimulation for a cochlear implant system which improves sound quality by increasing an intensity discrimination step for cochlear implant users and a neural stimulation IC chip based on a reconfigurable current DAC therefor.

BACKGROUND ART

Cochlear implant (CI) is an electric device that performs a function of damaged or lost auditory nerve cells by directly providing electrical stimulation to the auditory nerve, and is composed of a sound processor and an implantation device. The sound processor receives and processes sound signals through a microphone and transmits the processed sound signals to the implantation device wirelessly through an inductive coupling coil. The implantation device delivers the electrical stimulation to the auditory nerve through an electrode array according to the received data and also monitors the neural response and impedance as feedback and transmits the measured data to the sound processor. Here, a plurality of electrodes included in the electrode array are placed at different positions in the cochlea and transmit acoustic information by applying electric pulses at different intensities and frequencies.

The cochlear implant may be recommended for patients who cannot hear sounds below 90 dB. Currently, about 15 million patients are eligible to use the cochlear implant, but the number of patients who actually undergo surgery to use cochlear implant is only about 70,000 per year. One of reasons for the low use of cochlear implant is a sound quality problem.

Two major factors that affect sound quality are pitch distortion and intensity discrimination which are problems of frequency discrimination.

According to a previous study that analyzed the level at which intensities of normal people and cochlear implant users may be discriminated regarding the intensity discrimination, normal people may discriminate an intensity level between 50 and 200, whereas cochlear implant users may discriminate only intensity levels between 5 and 45. Therefore, there is a need for technology to increase an intensity discrimination level of cochlear implant users.

Non-Patent Document 1: Caldwell M T, et al, "Assessment and improvement of sound quality in cochlear implant users," Laryngoscope Investig Otolaryngol, 2017.

Non-Patent Document 2: Zeng F G, "Trends in cochlear implants," Trends Amplif, 2004.

Non-Patent Document 3: David A. Nelson et al, "Intensity discrimination as a function of stimulus level with electric stimulation," The Journal of the Acoustical Society of America, 1996.

DISCLOSURE OF THE INVENTION

Technical Problem

As such, the present invention is to provide a method for improving an effective dynamic range of neural stimulation for a cochlear implant system which improves sound quality by increasing an intensity discrimination step for cochlear implant users and a neural stimulation IC chip based on a reconfigurable current DAC therefor.

Technical Solution

According to an embodiment of the present invention for achieving the object, a method for improving an effective dynamic range of neural stimulation for a cochlear implant system includes acquiring a hearing profile of a user, setting a section between a T level and a C level as a target range of a stimulation current for each of a plurality of electrodes included in an electrode array of a cochlear implant system based on the hearing profile, and mapping a plurality of current levels to an output current within the target range.

In the mapping of the output current within the target range, a minimum current level among the plurality of current levels may be mapped to the T level, a maximum current level among the plurality of current levels may be mapped to the C level, and the other current levels may be mapped to a current between the T level and the C level in a linear, exponential, or piecewise linear manner.

In addition, according to the present invention, a neural stimulation IC chip based on a reconfigurable current DAC includes a clock & data recovery block configured to recover received data by using a clock, a back telemetry block configured to transmit data, a neural stimulator configured to transmit stimulation pulses to a plurality of electrodes included in an electrode array of a cochlear implant system, a neural recorder configured to monitor electrode impedance and an electrically-evoked compound action potential (ECAP) through the plurality of electrodes, and a digital controller configured to control an input signal of the neural stimulator according to data decoded by the clock & data recovery block and configured to transmit a signal received from the neural recorder to an external device through the back telemetry block, wherein the neural stimulator includes an offset DAC for setting a current offset and an incremental DAC for adding a predetermined current to the current offset, and generates and outputs a final output current by using output currents of the offset DAC and the incremental DAC.

The current offset may be set to a T level based on a hearing profile of a user, and the incremental DAC may add a predetermined amount of current such that a plurality of current levels are mapped to an output current between the T level and the C level.

Advantageous Effects

As such, according to the present invention, the resolution of stimulation current control may be significantly improved by allowing the given number of current levels to be utilized within the target range that is a section in which a user may hear without increasing the total number of current levels for neural stimulation and the resulting hardware implementation overhead. Through this, it is possible to improve sound quality by increasing an intensity discrimination level of a cochlear implant user.

BEST MODE FOR CARRYING OUT THE INVENTION

Figure 1:
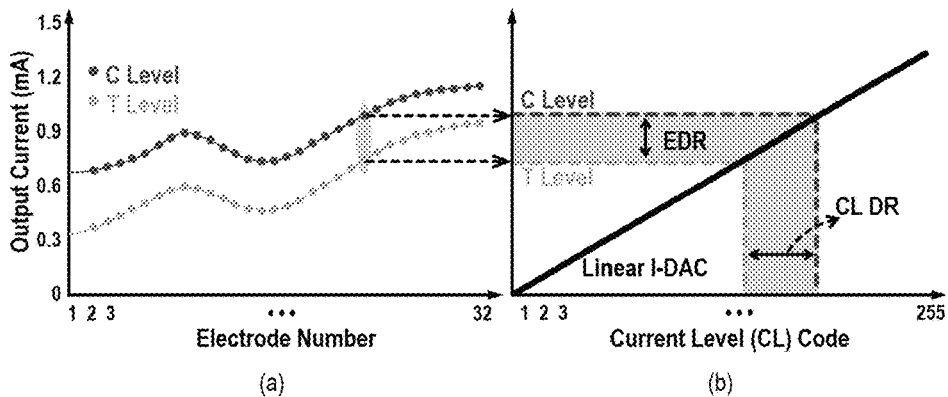
FIG. 1 illustrates diagrams of a control method according to a conventional current DAC (I-DAC) method.

Hereinafter, preferred embodiments according to the present invention are described in detail with reference to the attached drawings. In this process, thicknesses of lines or sizes of components illustrated in the drawings may be exaggerated for the sake of clarity and convenience of description.

Further, the terms described below are terms defined in consideration of functions of the present invention, and may change depending on the intention or custom of a user or operator. Therefore, definitions of the terms should be made based on the content throughout the present specification.

First, before describing a method for improving an effective dynamic range of neural stimulation for a cochlear implant system according to the present invention and a neural stimulation IC chip based on a reconfigurable current DAC therefor, device mapping for use of cochlear implant is described.

After a user undergoes surgery to insert an implantation device into the body to use cochlear implant, device mapping has to be performed for each user to deliver appropriate auditory nerve stimulation and each of a plurality of electrodes included in an electrode array.

A user may perceive hearing in a range of stimulation current between a hearing threshold (a T level) and a comfortable hearing level (a C level), both of which are significantly affected by interfacial impedance between an electrode and a tissue, and impedance values are different from each other for each electrode and each user. Therefore, in order to know the appropriate level of auditory nerve stimulation of a specific user by using a plurality of electrodes, a profiling procedure to construct a hearing profile for the user and a given electrode array is essential.

In the profiling procedure, the T level and C level may be determined typically according to a user's direct response. Also, for patients (for example, infants) who are unable to communicate, means such as an electrically evoked compound action potential (ECAP) may be used as feedback.

FIG. 1 illustrates diagrams of a control method according to the conventional current DAC (I-DAC) method. (a) illustrates a user's hearing profile, and (b) illustrates the control method according to the conventional I-DAC method.

Typically, the maximum stimulation current of cochlear implant is about 2 mA or less, and when a given current level is controlled to cover the entire current range of 0 to 2 mA according to the conventional fixed I-DAC method, the result is illustrated in (b) of FIG. 1. Here, EDR (Electrical Dynamic Range) represents an electrical dynamic range between a T level and a C level, and CL DR (Current Level Dynamic Range) represents a current level dynamic range. Among the given number of current levels of the cochlear implant, only the current levels in which an output current mapped to each current level is included in the EDR may deliver effective neural stimulation to the corresponding electrode of a user.

Figure 2:
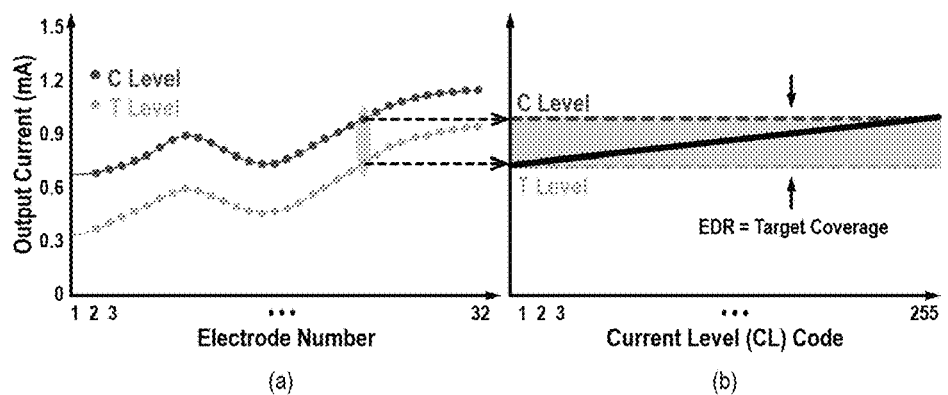
FIG. 2 illustrates diagrams of a control method according to the zoom current DAC (Zoom I-DAC) method of an embodiment of the present invention.

FIG. 2 illustrates diagrams of a control method according to a zoom current DAC (Zoom I-DAC) method of an embodiment of the present invention, (a) illustrates a user's hearing profile, and (b) illustrates a control method according to a zoom I-DAC method of the embodiment of the present invention.

Referring to FIG. 2, in the present invention, unlike the conventional control method, an EDR, which is a section between the T level and the C level, is set as a target range (target coverage) based on a hearing profile of each user, and a reconfiguration method in which any given current level is mapped to an output current within the EDR is used. For example, when there are a total of 255 current levels, the first current level is mapped to a T level current, the 255-th current level is mapped to a C level current, and the second to 254th current levels may be linearly mapped to currents within a target range.

As a result, the resolution of stimulation current control may be significantly improved by allowing the given number of current levels to be utilized within the target range that is a section in which a user may hear without increasing the total number of current levels and the resulting hardware implementation overhead. Through this, it is possible to improve sound quality by increasing an intensity discrimination level of a cochlear implant user.

Although FIG. 2 illustrates the linear I-DAC method in which current levels and output currents for each current level are linearly mapped to each other, the method according to the present invention described above may be applied to an exponential I-DAC method, piecewise linear (PWL) I-DAC method in the same manner described above. Here, an exponential I-DAC may be used to address electrophysiological characteristics of a human auditory system that require finer control at a low stimulation level compared to a high stimulation level, and PWL I-DAC may be used as a simple powerful alternative to the exponential I-DAC, and accordingly, a finer control may be performed around a T level which is a lower excitation level.

Figure 3:
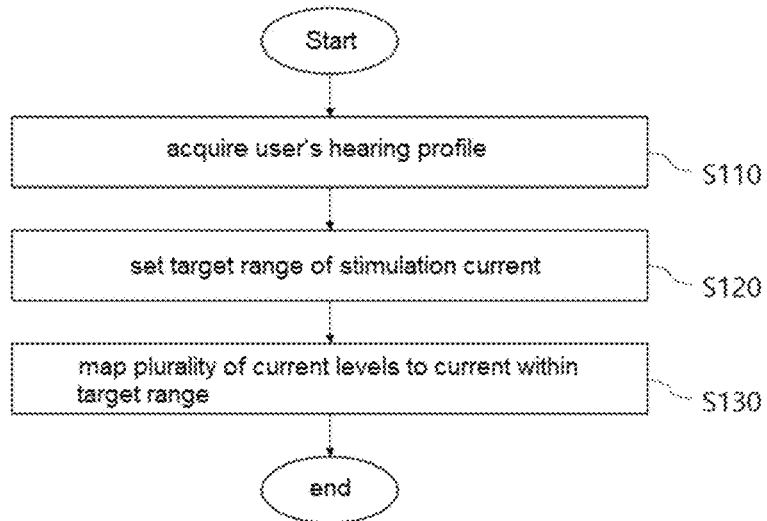
FIG. 3 is a flowchart of a method for improving an effective dynamic range of neural stimulation for a cochlear implant system according to an embodiment of the present invention.

FIG. 3 is a flowchart of a method for improving an effective dynamic range of neural stimulation for a cochlear implant system according to an embodiment of the present invention and is configured to increase an effective dynamic range by mapping all given current levels to currents within a target range according to the zoom I-DAC method described above with reference to FIG. 2.

Specifically, a user's hearing profile is first acquired (S110). Here, the hearing profile determines a T level and C level for each of a plurality of electrodes for a user, and the method of acquiring the hearing profile may be selected from various methods known to those skilled in the art, and detailed descriptions thereof are mitted.

Subsequently, a target range of a stimulation current is set (S120). Specifically, a section between the T level and the C level may be set as the target range of the stimulation current based on a user's hearing profile acquired in step S110.

Subsequently, a plurality of current levels are mapped to a current within the target range (S130). That is, as illustrated in FIG. 2, all given current levels are reconfigured to be mapped to an output current within the target range. According to one embodiment, the minimum current level may be mapped to the T level, which is a minimum current in the target range, and the maximum current level may be mapped to the C level, which is the maximum current in the target range, and a plurality of current levels therebetween may be mapped to a current between the T level and the C level in a linear, exponential, or piecewise linear manner.

The method for improving the effective dynamic range of neural stimulation for the cochlear implant system according to the embodiment of the present invention described above with reference to FIG. 3 may be performed by a processor (for example, a digital controller 227 of FIG. 4) included in an implantation device of a cochlear implant system.

Figure 4:
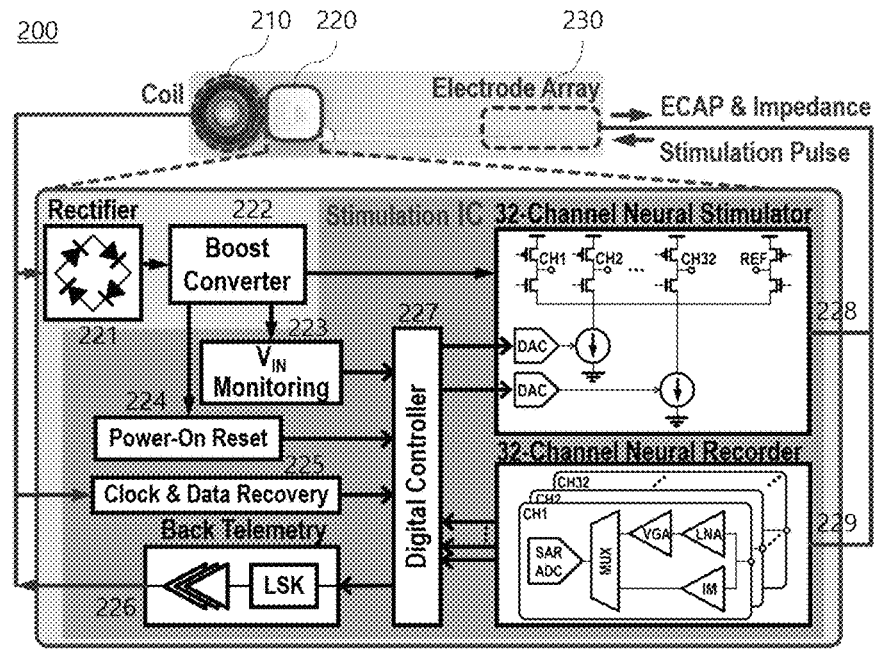
FIG. 4 is a diagram illustrating a configuration of an implantation device of a cochlear implant system according to an embodiment of the present invention.

FIG. 4 is a diagram illustrating a configuration of an implantation device of a cochlear implant system according to an embodiment of the present invention.

Referring to FIG. 4, an implantation device 200 of a cochlear implant system may be configured to include a coil 210 for wireless communication, an IC chip 220 for power management and neural stimulation, and an electrode array 230 including a plurality of electrodes for stimulation delivery.

The IC chip 220 is configured to include a rectifier 221 and a boost converter 222 for power management, an input voltage monitor 223 for neural stimulation, a power-on reset block 224, a clock & data recovery block 225, a back telemetry block 226, a digital controller 227, a neural stimulator 228, and a neural recorder 229.

Although FIG. 4 illustrates a case in which the neural stimulator 228 and the neural recorder 229 are composed of 32 channels as an example, the number of channels is not limited thereto and may be changed in various ways as needed.

The neural stimulator 228 delivers stimulation pulses to a plurality of electrodes, and in the present invention, the neural stimulator 228 may be configured to operate based on a reconfigurable current DAC. Specifically, the neural stimulator 228 may include two DACs, where one DAC operates as an offset DAC for setting a current offset, and the other DAC may operate as an incremental DAC to add a predetermined amount of current to the current offset. The neural stimulator 228 generates and outputs a final output current by using output currents of the offset DAC and the incremental DAC. For example, the offset DAC may set the T level as the current offset, and the incremental DAC may add a predetermined amount of current according to a determined slope such that a plurality of current levels are mapped linearly within a target range.

The neural recorder 229 monitors electrode impedance and ECAP.

The digital controller 227 controls multiple inputs of DACs of the neural stimulator 228 according to the data decoded by the clock & data recovery block 225 which recovers the received data by using clocks. Also, the digital controller 227 controls a neural response or stimulation artifact received from the neural recorder 229 to be transmitted to an external device through the back telemetry block 226 which transmits data.

Figure 5:
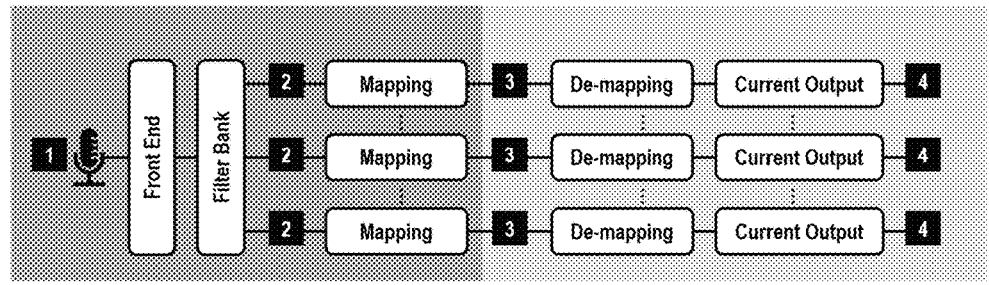
FIG. 5 is a diagram illustrating a signal processing process of cochlear implant.
Figure 6:
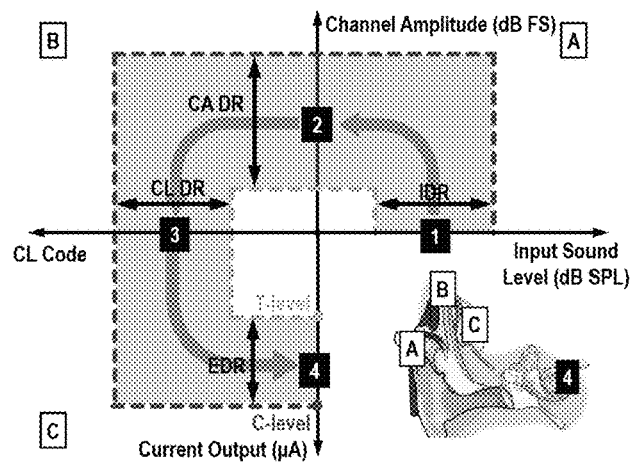
FIG. 6 is a diagram illustrating signal conversion according to a signal processing process of the cochlear implant illustrated in FIG. 5.

FIG. 5 is a diagram illustrating a signal processing process of cochlear implant, and FIG. 6 is a diagram illustrating signal conversion according to the signal processing process of the cochlear implant illustrated in FIG. 5.

First, referring to FIG. 5, the signal processing process of the cochlear implant may largely consist of four steps.

A first stage (1) is an acoustic step in which a wideband signal is captured by a microphone and subjected to pre-processing such as noise removal, pre-emphasis filtering, and so on.

A second step (2) is a digital step in which a broadband signal is digitized and energy is distributed for each channel, that is, divided into a separate frequency band.

A third step (3) is an electrical step in which energy of each channel is mapped to an electrode activation level.

A fourth step (4) is a stimulation step in which a stimulation current is selected for actual stimulation delivery.

Referring to FIG. 6, the wideband signal of the first step (1) is represented in units of dB SPL (Sound Pressure Level). This wideband signal is digitized, distributed for each channel, converted into a narrowband channel amplitude, and represented in units of dB FS (Full Scale) in the second step (2). Such channel amplitude information is mapped to a current level code, which is an activation level for stimulation in the third step (3). Finally, the current level code is de-mapped to actual current output and transmitted to an electrode array in the fourth step (4).

Dynamic ranges in the respective steps are illustrated to be different ranges. That is, the dynamic range is represented as an input dynamic range (IDR) in the first step, the dynamic range is represented as a channel amplitude dynamic range (CA DR) in the second step, the dynamic range is represented as a current level dynamic range (CL DR) in the third step, and the dynamic range is represented as electrical dynamic range (EDR) in the fourth step.

IDR defines a range of dB SPL that a cochlear implant user may actually hear, and EDR refers to an electrical dynamic range converted from the IDR, that is, the T level and the C level.

Figure 7:
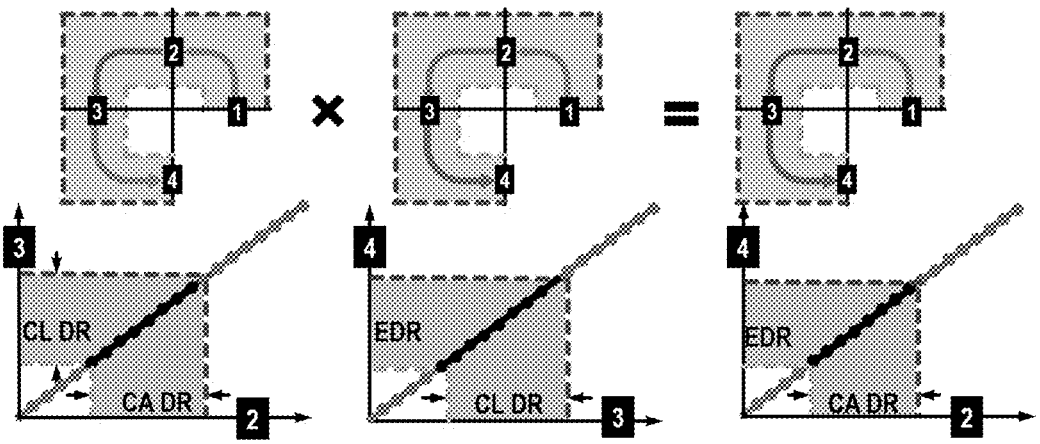
FIG. 7 illustrates diagrams of signal conversion when using the conventional control method illustrated in FIG. 1.
Figure 8:
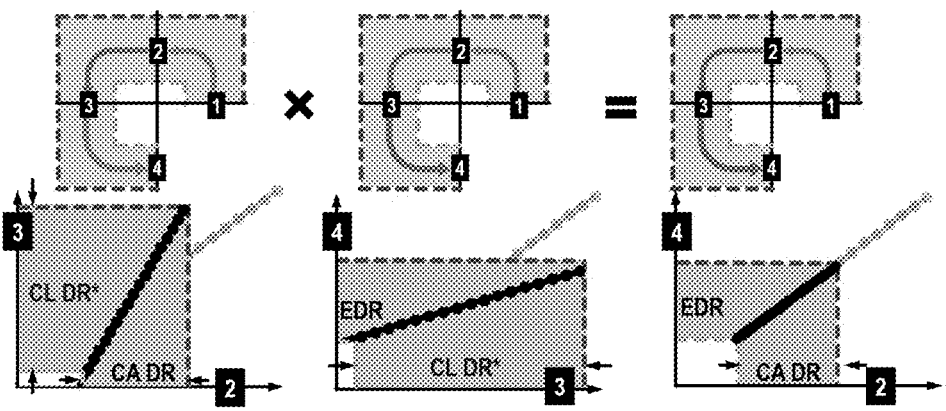
FIG. 8 illustrates diagrams of signal conversion when using the control method according to the present invention illustrated in FIG. 2.

FIG. 7 illustrates diagrams of signal conversion when using the conventional control method illustrated in FIG. 1, and FIG. 8 illustrates diagrams of signal conversion when using the control method according to the present invention illustrated in FIG. 2.

Referring to FIGS. 7 and 8 in parallel, when using the conventional control method, an effective dynamic range is reduced in each step in the process of mapping channel amplitude (CA) information of a narrowband in the second step to an actual output current through a current level (CL) code. In contrast to this, according to the present invention, CL DR is greatly improved by utilizing all given current level (CL) codes, and thus, the resolution of stimulation current control may be greatly increased.

Figure 9:
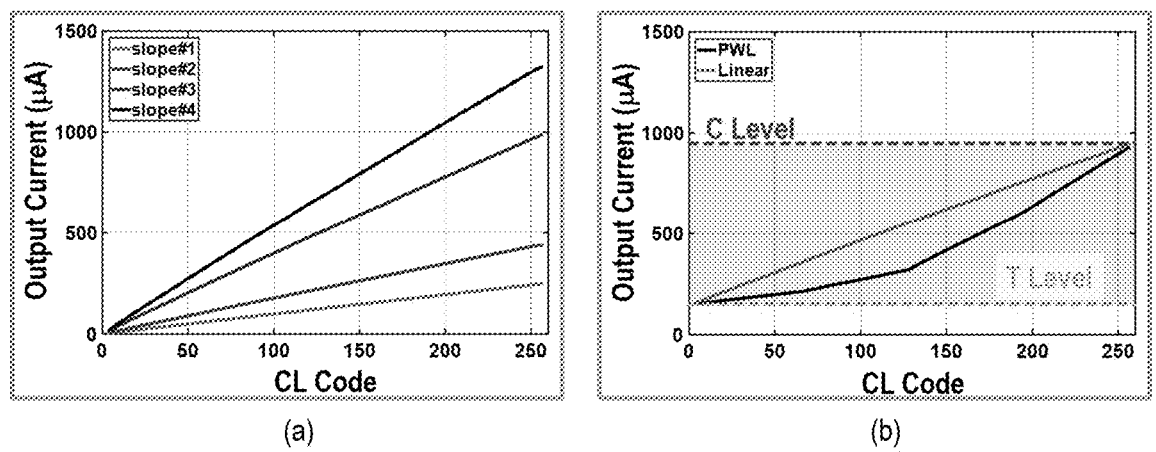
FIG. 9 illustrates diagrams of comparison of output currents according to the conventional technology and the present invention.

FIG. 9 illustrates diagrams of comparison of output currents according to the conventional technology and the present invention, where (a) represents the output current (controlled to different slopes) according to the conventional technology, and (b) represents the output current according to the present invention, and illustrates measurement results based on information disclosed in the conventional technology document and the embodiment of the present invention described above, assuming that the T level is 150 uA and the C level is 930 uA.

Referring to FIG. 9, it can be seen that, according to the present invention, all current levels output currents within a target range without increasing the total number of current levels.

The present invention is described with reference to the embodiments illustrated in the drawings but is merely illustrative, and those skilled in the art to which the corresponding technology belongs will understand that various modifications and other equivalent embodiments may be derived therefrom. Therefore, the true technical protection scope of the present invention should be determined by the technical idea of the patent claims below.

The invention claimed is:

1. A method for improving an effective dynamic range, the method comprising:
   acquiring a hearing profile of a user;
   setting a section between a T level and a C level as a target range of a stimulation current for each of a plurality of electrodes included in an electrode array of a cochlear implant system based on the hearing profile; and
   mapping a plurality of current levels to an output current within the target range.

2. The method of claim 1, wherein in the mapping of the output current within the target range, a minimum current level among the plurality of current levels is mapped to the T level, a maximum current level among the plurality of current levels is mapped to the C level, and the other current levels are mapped to a current between the T level and the C level in a linear, exponential, or piecewise linear manner.

3. A neural stimulation IC chip based on a current DAC, the neural stimulation IC chip comprising:
   a clock & data recovery block configured to recover received data by using a clock;
   a back telemetry block configured to transmit data;
   a neural stimulator configured to transmit stimulation pulses to a plurality of electrodes included in an electrode array of a cochlear implant system;
   a neural recorder configured to monitor electrode impedance and an electrically evoked compound action potential through the plurality of electrodes; and
   a digital controller configured to control an input signal of the neural stimulator according to data decoded by the clock & data recovery block and configured to transmit a signal received from the neural recorder to an external device through the back telemetry block,
   wherein the neural stimulator includes an offset DAC for setting a current offset and an incremental DAC for adding a predetermined current to the current offset, and generates and outputs a final output current by using output currents of the offset DAC and the incremental DAC.

4. The neural stimulation IC chip of claim 3,
   wherein the current offset is set to a T level based on a hearing profile of a user,
   wherein the incremental DAC adds a predetermined amount of current such that a plurality of current levels are mapped to an output current between the T level and the C level.

* * * * *